April 2, 1940.  C. R. STAHL ET AL  2,195,544
APPARATUS FOR LOADING COAL
Filed Aug. 26, 1937   11 Sheets-Sheet 2

Inventors
Charles R. Stahl
Kenneth Davis
Attorney

April 2, 1940.  C. R. STAHL ET AL  2,195,544
APPARATUS FOR LOADING COAL
Filed Aug. 26, 1937  11 Sheets-Sheet 3

Inventors
Charles R. Stahl
Kenneth Davis
By
Attorney

Inventors
Charles R. Stahl
Kenneth Davis
By
Attorney

April 2, 1940.　　　　C. R. STAHL ET AL　　　　2,195,544
APPARATUS FOR LOADING COAL
Filed Aug. 26, 1937　　　　11 Sheets-Sheet 5

Inventors
Charles R. Stahl
Kenneth Davis
By
Attorney

April 2, 1940.     C. R. STAHL ET AL     2,195,544
APPARATUS FOR LOADING COAL
Filed Aug. 26, 1937     11 Sheets-Sheet 6

Inventors
Charles R. Stahl
Kenneth Davis
By
Attorney

April 2, 1940.  C. R. STAHL ET AL  2,195,544
APPARATUS FOR LOADING COAL
Filed Aug. 26, 1937   11 Sheets-Sheet 8

Patented Apr. 2, 1940

2,195,544

UNITED STATES PATENT OFFICE 2,195,544

APPARATUS FOR LOADING COAL

Charles R. Stahl and Kenneth Davis,
Powellton, W. Va.

Application August 26, 1937, Serial No. 161,118

27 Claims. (Cl. 214—58)

The invention relates generally to mining and primarily seeks to provide a new and improved apparatus for mining coal.

In the mining of coal, it frequently happens that narrow or shallow seams of coal are encountered which may measure only 30 inches in depth. Without suitable apparatus particularly adapted to the purpose, such seams of coal cannot be profitably mined, and the present invention, among other objects, seeks to provide a novel apparatus designed to make this type of mining practical.

I am aware that in the mining of shallow, or even deep coal seams, attempts have been made to undercut the fact wall of the seam and to project into the undercut endless conveyors or drag pans by means of which it was hoped to take out or load the mass of overlying coal after it had been "shot down" onto said conveyors or pans. The weight of the mass too often caused breakage and failure of the conveyors, and the pan method was too slow and uncertain to be practical. Attempts also have been made to employ drag lines and scoops or the like, but such attempts have failed because of the inefficiencies inherent in the scoop or drag structures and because of the inability to anchor the drag line at a low point in or behind the "shot down" coal mass so as to avoid riding up of the scoop or drag and the resulting failure properly to take out the loose coal.

Among its several objects the invention therefore seeks to provide a novel apparatus suitable for practicing the method of mining and loading coal which consists in undercutting the coal wall or seam, anchoring a drag line at a low point or practically on the seam floor and deep in the undercut, "shooting down" or otherwise depositing the overlying coal wall in a loose mass directly upon the drag line, and utilizing the line to reciprocate a gathering unit such as a slipper or skip into and out of the coal mass to load the coal onto cars.

In its more detailed nature, the apparatus of the invention includes an anchor rail by which the drag line can be projected into the coal wall undercut, and by which it can be firmly anchored in the "shot down" mass of coal, attached guide rail units, a novel form of coal gathering slipper or skip guided by the rail units and reciprocated by the drag line, and means for imparting movement to the line.

Another object of the invention is to provide a novel type of coal gathering slipper or skip in which is embodied a shovel end for engaging the coal mass, and means for automatically lowering said end before it enters the coal mass and for thereafter again lifting it to facilitate the taking away of the gathered load of coal.

Another object of the invention is to provide a reciprocated coal gathering slipper or skip and guiding and supporting means therefor, all so constructed and arranged as to assure against the taking up of dirt or debris along with the coal which it is sought to gather.

Another object of the invention is to provide novel means for automatically stripping off from the slipper or skip the individual coal loads gathered thereon.

Another object of the invention is to provide a novel form of self propelled coal gathering slipper or skip wherein is included power actuated devices to facilitate the digging in and gathering of the mass of coal to be loaded.

With the above and other objects in view which will hereinafter appear, the nature of the invention will be more clearly understood by following the description, the appended claims, and the several views illustrated in the accompanying drawings.

In the drawings:

Figure 3 is a vertical cross section taken on the line 3—3 of Figure 2.

Figure 37 is a somewhat diagrammatic plan view illustrating a self-propelled slipper and guide rail equipment therefor.

Figure 40 is a detail vertical cross section taken on the line 40—40 on Figure 39.

Figure 41 is a fragmentary side elevation diagrammatically illustrating the operation of the shovel gate latching and releasing means.

Figures 42 and 43 are diagrammatic plan views respectively illustrating inside and outside curve trackway arrangements for the slipper shown in Figures 38 and 39.

Like reference numerals designate corresponding parts throughout the several figures of the drawings.

Figure 1:
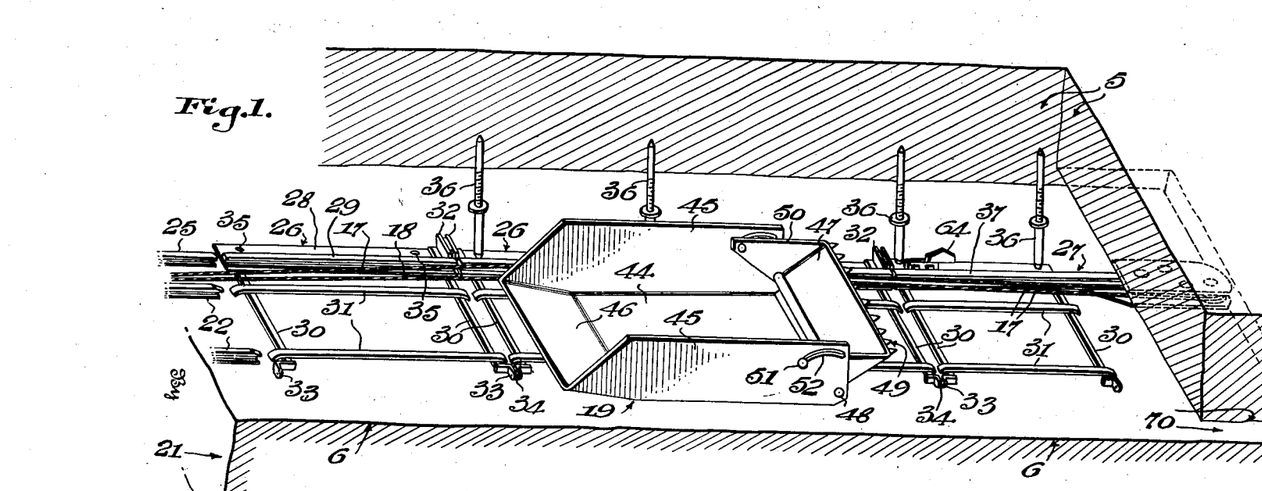
Figures 1 and 1A together comprise a somewhat diagrammatic perspective view of a mine section with apparatus of the invention operatively mounted therein.
Figure 1A:
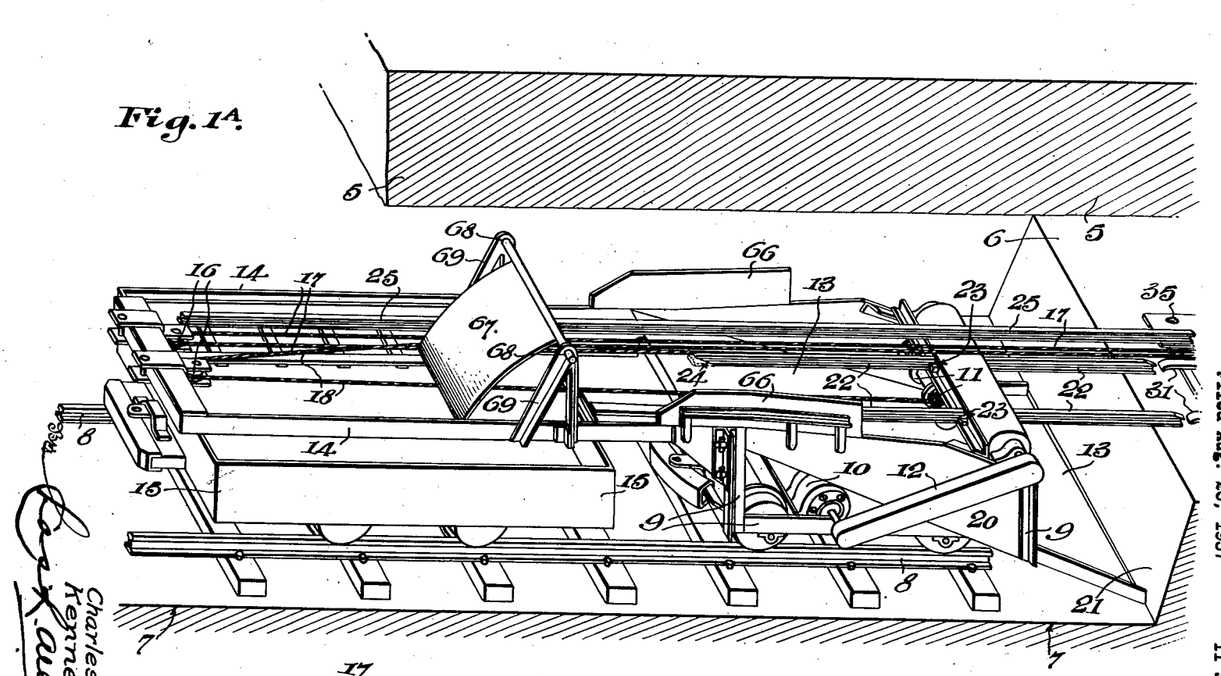
Figure 2:
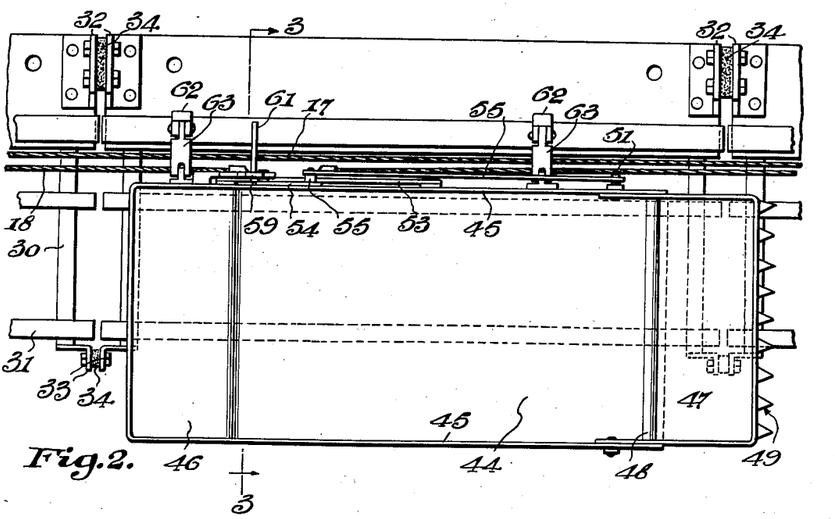
Figure 2 is a detail plan view of a guide rail portion of the apparatus and the slipper guided thereon.
Figure 4:
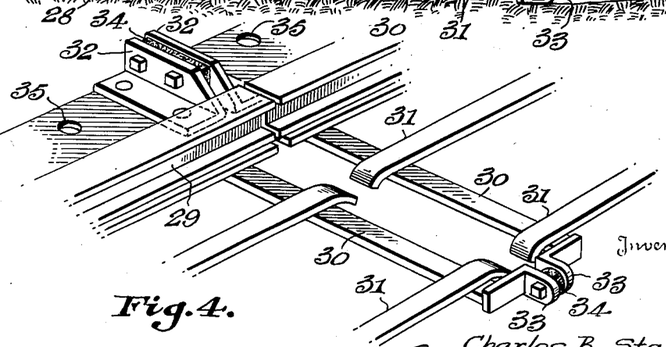
Figure 4 is an enlarged detail perspective view illustrating a joint between guide rail sections.
Figure 21:
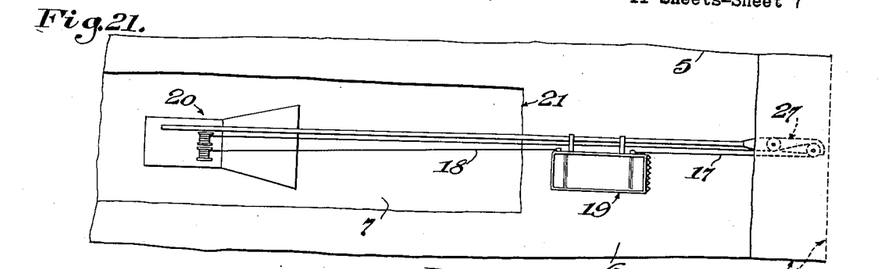
Figure 21 is a diagrammatic plan view showing the invention in use in the making of a driving entry.

In Figures 1, 1A, and 21, we have illustrated the invention in use in the making of a "driving entry". As has been previously stated, the invention is particularly adapted to use in loading coal mined from shallow veins in which great difficulty has heretofore been experienced in attempts to use mechanical devices, said seams frequently being as shallow as 30 inches, naturally greatly restricting mining operations. In the illustrations referred to, the shallow coal seam is indicated at 5. In order to gain access to the seam, for mining purposes, it is necessary to take out bottom material beneath the seam. The shelf or seam floor resulting from the mining or taking out of coal from the shallow vein is indicated at 6, and 7 designates the floor formed by the taking out of the bottom material. See Figures 1 and 1A.

Figure 44:
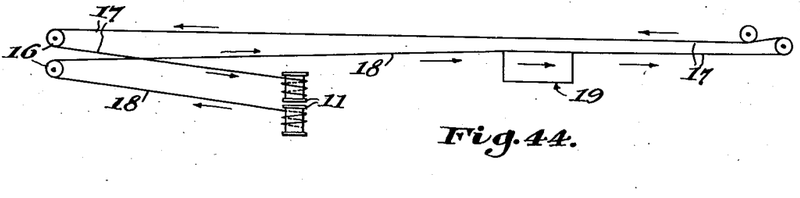
Figure 44 is a diagrammatic plan view illustrating the arrangement of the cable, drum, and slipper equipments employed in Figures 1 and 1A.

In the Stahl Patent 1,862,610, of June 14, 1932, there is disclosed a material loading machine particularly adapted to the taking out of bottom material for the purposes above mentioned, and a machine of this general character is employed in combination with other apparatus and elements in the practical development of our invention. The parts of this type of machine being disclosed in detail in the patent mentioned, the machine will be referred to herein only in a general way. This machine is movable, under its own power, over trackage 8 laid on the floor 7 and includes a frame 9, a motor 10, hoist drums 11 driven by suitable transmission connections 12 from said motor, and an upwardly inclined pan 13 over which the bottom material may be dragloaded as disclosed in the Stahl patent. The pan 13 delivers, at its rear end, onto an open bottomed boom 14 removably secured to and extending rearwardly from the machine frame over one or more cars 15 of a trip of mine cars movable over the trackage 8. Two pulleys 16 are mounted at the rear end of the boom and two cables designated 17 and 18 are wound around the respective drums and looped over said pulleys. The cables are hereafter respectively designated advancing and retracting cables and preferably are reversely wound upon the drums 11 rigidly secured on the drum driving shaft so that when the slipper advancing cable 17 is being wound in, the slipper retracting cable 18 will be paying out and vice versa, as is diagrammatically illustrated in Figure 44. The coal loading slipper, to opposite ends of which the free ends of the cable 17 and 18 are secured, is generally designated 19. It will thus be seen that the slipper 19 is reciprocated back and forth with respect to the coal-to-be-loaded instead of a drag of the type shown in the Stahl patent.

In the making of the driving entry above referred to and shown in Figures 1, 1A, and 21, the hoist and boom unit generally designated 20 in the diagrammatic views is moved in close to the wall 21 provided at the advance end of the bottom material takeout as shown in Figure 1A. Skid rails 22 bridge the gap between the drum cradle and the pan and between said cradle and the edge of the seam floor 6 as shown in Figure 1A. The rails 22 extending between the cradle and the floor 6 are supported on said floor and in receiving sockets 23 formed in the cradle, and those extending between the cradle and the pan are supported in similar sockets 23 and sockets 24 formed in the pan. A guide rail 25, preferably an I-beam, is provided and is supported at its advance end over the floor 6 and extends over the pan and along the boom 14, as shown in Figure 1A.

Upon the floor 6 a suitable number of slipper guide rail units are mounted. These rails are generally designated 26 in the diagrammatic views and are shown in detail in Figures 1 to 5 of the drawings. These rails are removably secured together, end to end, to form a continuous guiding trackage, and at the end of the trackage thus formed is secured an anchor rail unit. The anchor rail units are generally designated 27 in the diagrammatic figures and are shown in detail in Figures 1, 8 and 9.

Each guide rail unit includes a base plate 28, an I-beam guide rail 29 secured longitudinally upon and upstanding from said plate, laterally extended bars 30, and skid rails 31 supported on said bars in parallel relation to said guide rails. An upstanding angular member 32 is secured at each end of each plate and an angular member 33 is secured at the extended end of each bar 30. The guide rail sections are assembled by bolting together the angular members 32 and 33, and in order to impart a measure of flexibility to the trackage, rubber blocks 34 may be interposed between the opposed angular members. Each base plate 28 includes a pair of jack receiving apertures or seats 35 for receiving screw jacks 36. It will be obvious that when the screw jacks 36 are applied to the rail sections, as indicated in Figure 1 of the drawings, they will be rigidly held in position so as to securely mount the coal loading slipper and guide its reciprocation into and out of the broken coal mass.

Figure 8:
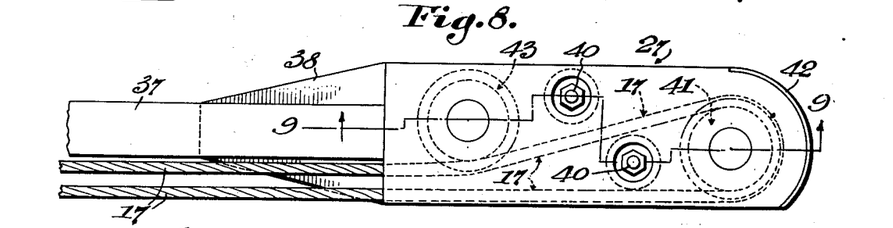
Figure 8 is a detailed plan view of the anchor rail portion of the apparatus.
Figure 9:
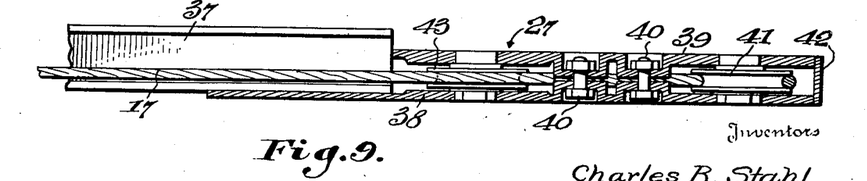
Figure 9 is a vertical longitudinal section taken on the line 9—9 on Figure 8.

The anchor rail unit, shown in detail in Figures 8 and 9, may include the same base plate and skid structure embodied in the guide rail sections but its guide rail 37 is extended upon said base plate and carries upper and lower housing plates. The lower housing plate is designated 38, and the companion top plate 39, and these plates are removably secured together as at 40. A sheave 41 is rotatably supported between the plates at the end of the anchor rail section and is protected from the broken coal mass by the plates 38 and 39 and end wall 42. A guide pulley 43 is rotatably mounted between the plates 38 and 39 and the sheaves 41 and 43 serve to anchor and guide the looped forward end of the cable 17 and position it in approximate parallel flights extending along inside the trackage, as indicated in Figure 8.

The coal loading slipper generally designated 19, comprises a box-like structure including a bottom 44, sides 45, an upwardly inclined rear wall 46, and an open front end. The open front end is equipped with a shovel gate 47 hingedly connected at its lower edge with the slipper, as indicated at 48, and including coal mass penetrating teeth 49 at the edge thereof directed toward the coal-mass-to-be-loaded. The gate includes side flanges 50 having a laterally extended guide pin 51 movable in arcuate slots 52 provided in the slipper side walls. See Figures 1, 2, 3 and 10.

Figure 10:
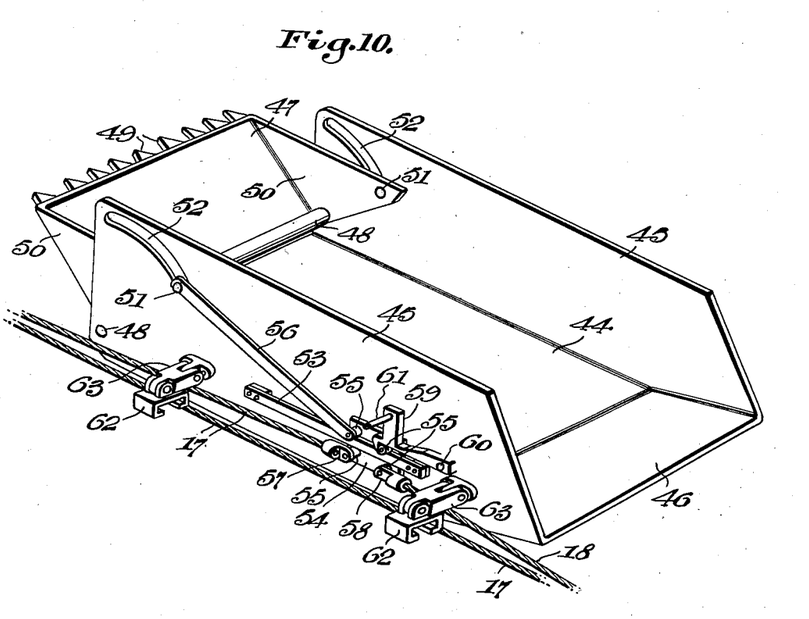
Figure 10 is a detail perspective view of the slipper shown in Figures 1 and 3.

A guide bar 53 is secured to one side wall 45 of the slipper, in spaced relation to said side, and a slide plate 54 equipped with four laterally projected bar embracing roller pins 55 is slidable along said bar, as shown in Figures 3 and 10. A link 56 connects the advance upper pin 55 with one of the laterally projected shovel gate pins 51 so that the shovel gate will be lowered to present its coal mass penetrating edge 49 to a broken coal mass, or elevated to the loaded coal retaining position, as shown in Figure 10, accordingly as said slide member 54 is moved to its forward or rearward limit along the guide bar 53.

The slipper projecting or advancing cable 17 is connected to the lower advance pin 55 and the slipper retracting or return cable 18 is secured to the rearward lower pin 56. Thus when said cables are moved in one direction or the other as previously described in connection with member 54, the slipper will be projected into or withdrawn, loaded, from the broken coal mass.

Figure 5:
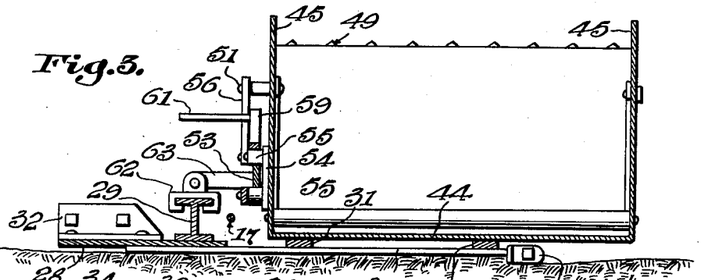
Figure 5 is a detail perspective view of one of the skid-track-equipped guide rail units.
Figures 5, 6, 7:
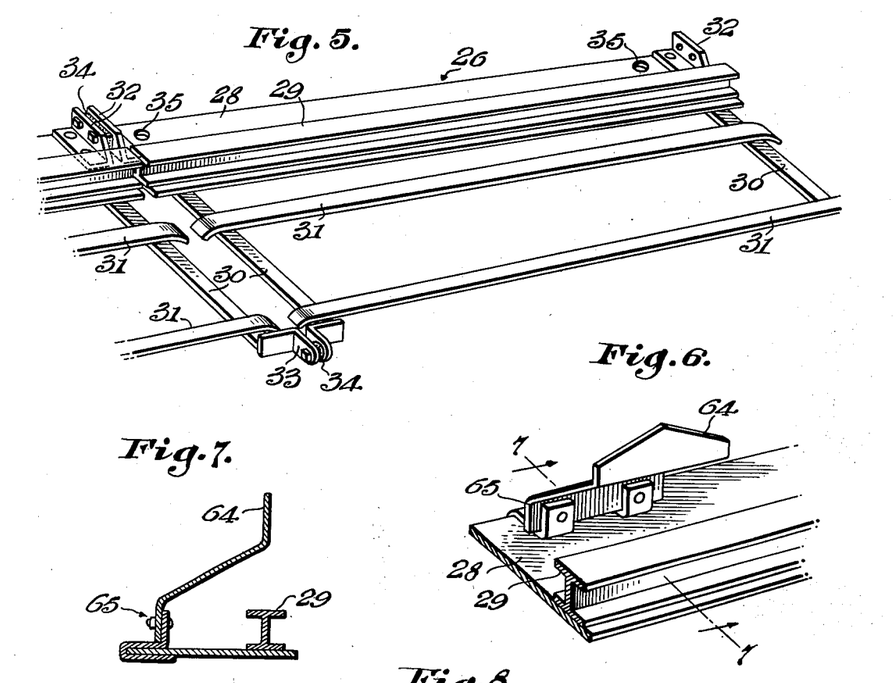
Figure 6 is a detail perspective view of a fragment of the guide rail unit to which the slipper shovel controlling cam is attached.
Figure 7 is a vertical cross section taken on the line 7—7 on Figure 6.

A latch member 59 is pivoted as at 60 to the slipper side in position for latching over the upper rear pin 55 as shown in Figure 10. This latch member will serve to secure the shovel gate in the loaded coal retaining position during withdrawal of the slipper. The latch includes a laterally projected trip finger 61. See Figures 3 and 10. It will be noted also that rail grippers 62 are carried by the slipper, being pivot-link-connected thereto as at 63. These grippers are slidably guided along the grip rail and anchor section formed trackage, the pivot links permitting the limited amount of up and down movement of which the slipper will necessarily partake in passing over uneven floor surfaces even though guided by skid trackage, the use of which is optional. The latch tripping finger 61 is engageable with a latch releasing cam 64 secured as at 65 on the anchor rail section base plate, as shown in Figures 1, 6 and 7.

Figure 11:
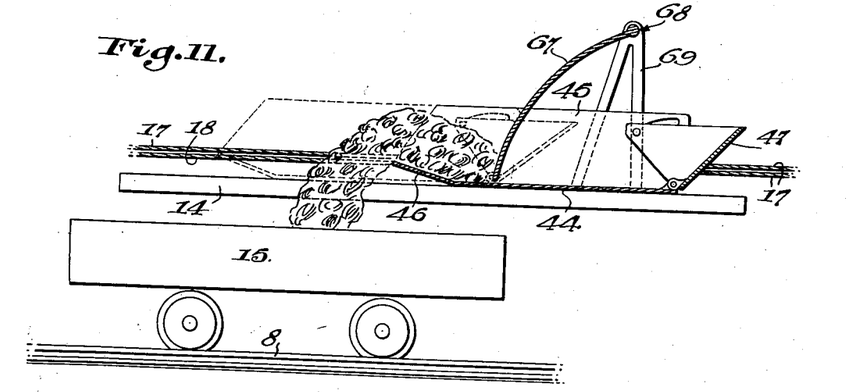
Figure 11 is a somewhat diagrammatic longitudinal section illustrating the scraping out or unloading of the slipper.

The bottom take-out unit may, if desired, be provided with removable side wing elements 66, and a stripper plate 67 is pivotally supported as at 68 upon a bracket member 69 rigidly mounted upon and upstanding from the boom 14, as shown in Figures 1A and 11. The plate 67 serves the purpose of stripping the loaded coal from the gathering slipper, as shown in Figure 11, and is of a width just less than the inside width of the slipper.

In utilizing the invention in loading coal from a shallow seam, in the making of a driving entry, the parts are arranged as shown in Figures 1, 1A, and 21 with the anchor rail section 27 projected into an undercut 70, as shown in Figure 1. With the parts thus mounted the mass of coal overhanging the undercut is shot or otherwise broken down upon the anchor rail section and the control devices of the take-out machine 20 are actuated to alternately wind in and out the cables 17 and 18 for reciprocating the slipper 19 into and out of the broken coal mass. Each time the slipper is about to move into the mass of coal, the trip finger 61 engages the cam 64, and the latch member 59 which has been holding the shovel gate in its elevated position and the slide 54 in its rearmost position releases said slide and the cable 17 which has been drawing the slipper forwardly will draw said slide forwardly and force the shovel gate to its lowered, coal mass penetrating position, in which position it will dig into and gather a load of coal from the broken coal mass. As the rotation of the drums 11 is reversed, the cable 18 will move the slide 54 along the bar 53 and raise the shovel gate 47 to the coal load retaining position illustrated in Figure 10 and as the slide 54 moves again to its rearmost position, it will be latched in that position by the member 59. The cable 18 now withdraws the slipper from the coal mass and draws it rearwardly along the trackage and over the boom 14 and under the stripper plate 67 mounted thereover. As the slipper is moved beneath said plate, as shown in dotted lines in Figure 11 of the drawings, the plate will pass freely over the load of coal until it reaches the shovel gate equipped end of the slipper. The direction of rotation of the drums 11 is again reversed and the cable 17 draws the slipper forwardly causing the plate to move down behind the load of coal and strip it from the slipper, as shown in full lines in Figure 11.

Figure 12:
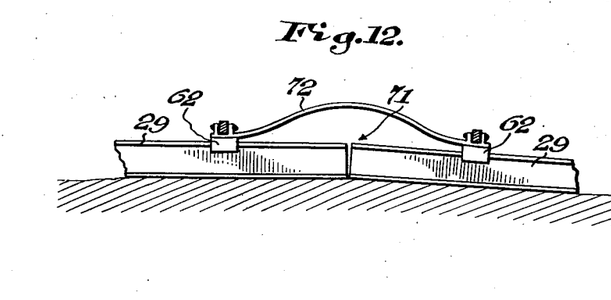
Figure 12 is a detail elevation and part section illustrating a bowed connection between the guide rail grippers.

As previously stated, mine floor surfaces are rough and the flexibly connected track sections might hump as indicated at 71 in Figure 12. In order properly to guide movement of the rail grippers 62 in a manner preventing canting and resultant binding, said grippers may be connected by a distance piece 72 upwardly bowed so as to readily pass over such trackage humps 71 as might exist.

Figures 13, 14:
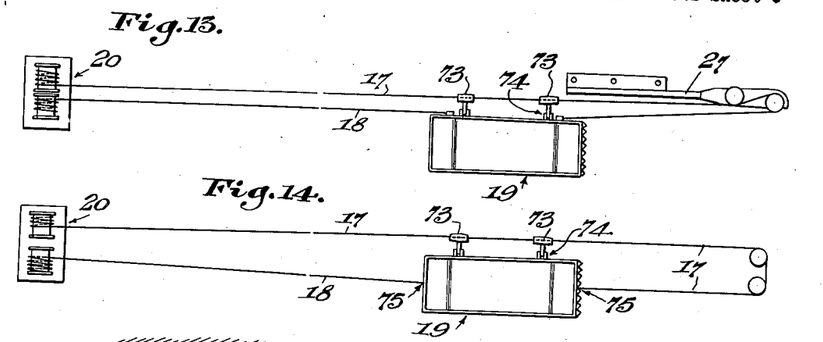
Figure 13 is a diagrammatic plan view showing a side-drawn slipper controlled and guided by the draft cable.
Figure 14 is a view similar to Figure 13 showing a center-drawn slipper.

In Figure 13 of the drawings, we have illustrated a modified arrangement in which the rigid trackage is eliminated and the slipper 19 is cable guided. In this arrangement the slipper may be provided with laterally projected guide members 73 which may be hinge-connected as at 74 with the slipper. These guide members slidably encircle a relatively taut guiding cable which, in this particular illustration, may be the cable 17 hereinbefore referred to. In this figure, the ends of the cables 17 and 18 are connected at one side of the slipper. In Figure 14, we have shown a similar cable guide arrangement in which the ends of the cables are attached centrally to the slipper as at 75 instead of at the sides in the forms of the invention hereinbefore described.

Figure 15:
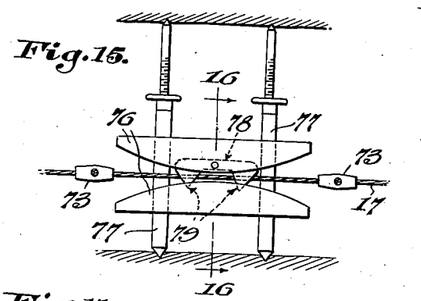
Figure 15 is a detail side elevation showing one means for supporting the guiding cable portions shown in Figures 13 and 14.
Figure 16:
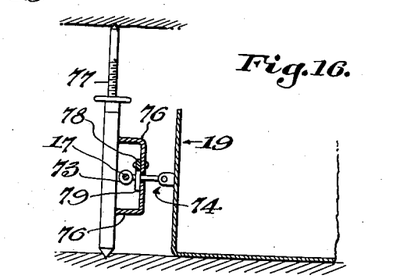
Figure 16 is a vertical cross section taken on the line 16—16 on Figure 15.

It will be obvious that instead of utilizing the return flight of the slipper projecting cable 17 as a relatively taut guide cable, a taut cable rigidly connected at its respective ends may be provided for this specific purpose. Whatever type of cable guide is employed should be supported in some manner to prevent free lateral deflection. In Figures 15 and 16, we have disclosed a means for so supporting the guide cable. This means comprises a pair of retainer plates 76 supported across a pair of supporting jacks 77 with a slipper guide-eye opening or passage formed therebetween. Aside from the narrow opening thus permitted for passage of the guide eyes, the plates 76 and the jacks 77 retain the cables against free lateral deflection. The eye passing opening between the plates 76 is effectively closed by a rockable retainer plate 78 equipped with cam noses 79 at its respective ends shaped to be deflected by the guide eyes 73.

Figures 17, 18:
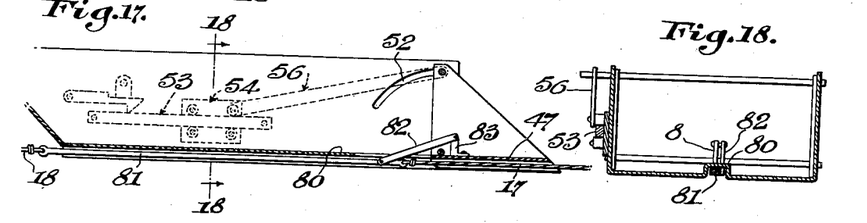
Figure 17 is a central longitudinal section illustrating a center draft form of slipper.
Figure 18 is a vertical cross section taken on the line 18—18 on Figure 17.

In Figures 17 and 18, we have disclosed a modified form of slipper of the center draft type. This slipper is provided with a tunnel 80 formed centrally along the bottom thereof, and a rod member 81 is reciprocable in said tunnel and connected by a link 82 with a crank member 83 carried by the shovel gate 47. The cables 17 and 18 are connected to the respective ends of the rod 81. Whenever the cable 17 is in control, the shovel gate will be moved to its lowered position as shown in full lines in Figure 17, and whenever the cable 18 takes control it will pull the rod 81 and link 82 rearwardly, and through the crank connection 83, will lift the shovel gate 47 to the coal load retaining position.

Figure 19:
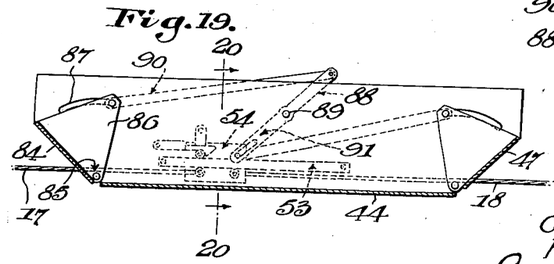
Figure 19 is a central longitudinal section of a slipper equipped with a shovel gate at each end.
Figure 20:
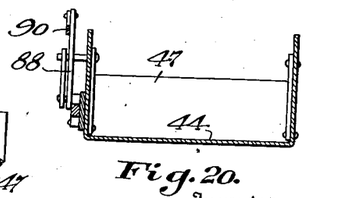
Figure 20 is a vertical cross section taken on the line 20—20 on Figure 19.

In Figure 19 of the drawings, we have shown a slipper of the double end, double acting type, in which a shovel gate is provided at each end. In this illustration the second shovel gate is indicated at 84 and is hinged at 85 adjacent the bottom of the slipper, the gate side wings 86 having laterally projected pins movable in arcuate slots 87 provided therefor in the slipper sides. A gate operating lever 88 is pivoted intermediate its ends as at 89 upon one slipper side wall and is link-connected as at 90 to the shovel gate 84 and slot-and-pin connected as at 91 with the slide plate 54. In this form of slipper either of the shovel gates may be presented to a broken mass of coal-to-be-loaded.

Figure 22:
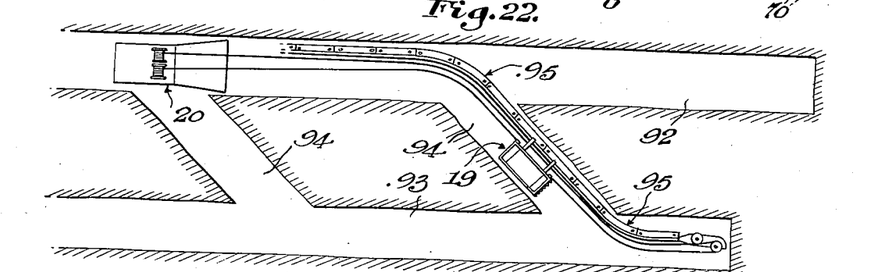
Figure 22 is a diagrammatic plan view showing the invention in use in air course working.

In Figure 22 of the drawings, we have illustrated the invention in use in mining and loading coal from an air course paralleling a driving entry. The driving entry is illustrated at 92 and is made in the manner hereinbefore described. It is customary in the making of driving entries to also run an air course 93 paralleling such entry and connected therewith by diagonally disposed connecting courses 94 so as to afford communication between the mining entry and the air course. When the desired driving entry has been completed, it may be found desirable to mine and load coal from the air course, and our improved apparatus can be employed in accomplishing this by interposing in the trackage hereinbefore described, suitable curved portions indicated at 95 so that the trackage can be extended longitudinally in the driving entry, then through a communicating diagonal course 94, and again longitudinally in the air course 93. The operation of the slipper is as previously described.

Figure 23:
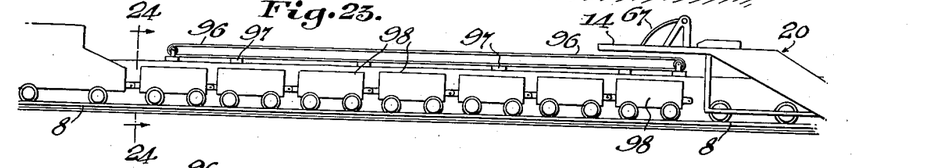
Figure 23 is a diagrammatic side elevation illustrating the delivery of the slipper-gathered coal onto a long conveyor, and from thence into successive cars of a trip.
Figures 24, 25, 26:
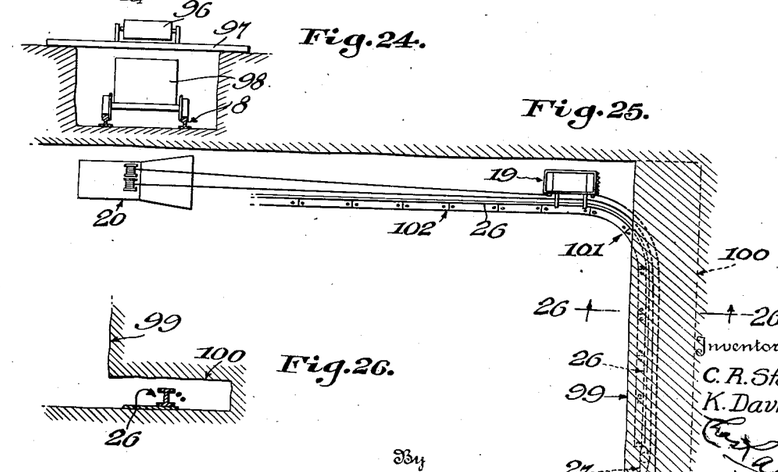
Figure 24 is a vertical cross section taken on the line 24—24 on Figure 23.
Figure 25 is a diagrammatic plan view illustrating the loading of coal shot down across the vein face in a wide room.
Figure 26 is a vertical cross section taken on the line 26—26 on Figure 25.

In Figures 23 and 24, we have shown a modified adaptation of the invention in which the gathered coal, instead of being deposited directly through the boom 14 into the trip of cars, is deposited onto a long conveyer 96, suitably supported as at 97, and from thence serially into the cars 98 of the trip of cars movable along the trackage 8.

In Figures 25 and 26, we have illustrated the invention in use loading coal broken down from a long face across a wide room. The coal face is indicated at 99 and this face is undercut as at 100 to receive the anchor rail section 27 and a number of guide rail sections 26 as shown in Figure 25. Suitable guide rail sections are employed to provide a turn portion 101 extending from beneath the undercut and joining a trackage portion composed of sections 26 and designated 102 and which extends at right angles to the trackage laid under the undercut. In this form of the invention, the coal mass overlying the undercut is shot down upon the trackage and the slipper is reciprocated into and out of the mass along the mass covered trackage portion and the portion 102 thereof free of said mass.

Figures 27, 28, 29:
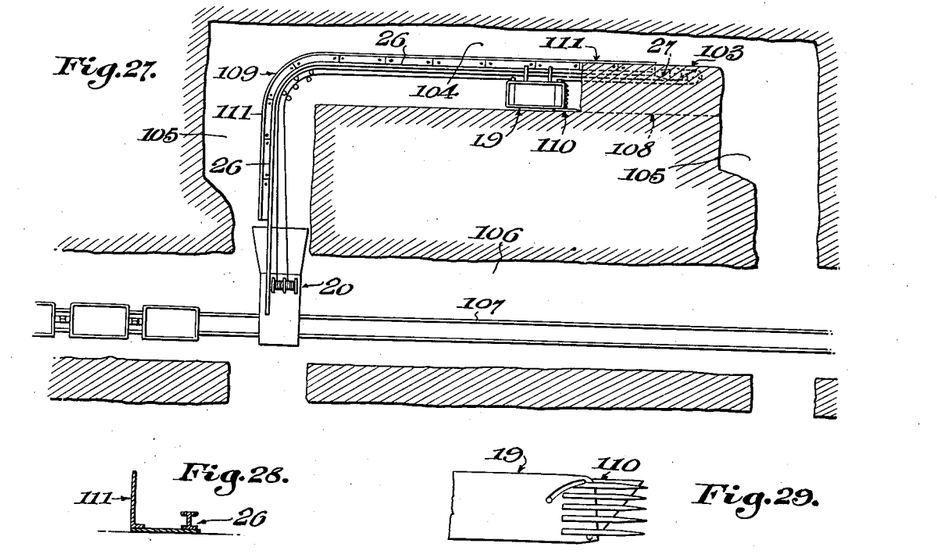
Figure 27 is a diagrammatic plan view illustrating the loading of coal shot down from a long face across the vein.
Figure 28 is a detail vertical cross section of a portion of guide rail equipped with a coal confining fence plate for use in long face mining.
Figure 29 is a detail side elevation of the driving end of the slipper employed in Figure 27.

In Figures 27, 28 and 29, we have shown another arrangement of the invention in which coal is loaded after being shot down from a long face across a wide room. In the form of the invention shown in Figure 25, sections 26 are added to the trackage portion 102 as the face being mined recedes from the cable drums. In the form of the invention shown in Figure 27, the face being mined recedes toward the drum and, correspondingly, guide rail sections would be removed instead of being added as the mining and loading progresses. In this form of the invention, the room face is indicated at 103, being supported upon the main body of the vein by a cross-cut 104 which joins two rooms 105. The main course in which the trackage is laid is indicated at 106 and the trackage is designated 107. As in the long face mining method previously described, the anchor rail section 27 and a number of guide rail sections 26 are laid in the room long face undercut 108, and this trackage portion is connected by a curved portion 109 with the main body of the trackage disposed at right angles to the covered trackage as hereinbefore described. When thus used the slipper 19 preferably is provided at the front edge of the face thereof presented toward the long face, with forwardly projected wall engaging teeth 110. The rail sections 26 may also be provided with fence plates 111 for confining the coal mass when it is broken down onto the underlying rail sections 26 and 27. See Figure 28.

Figures 30, 31:
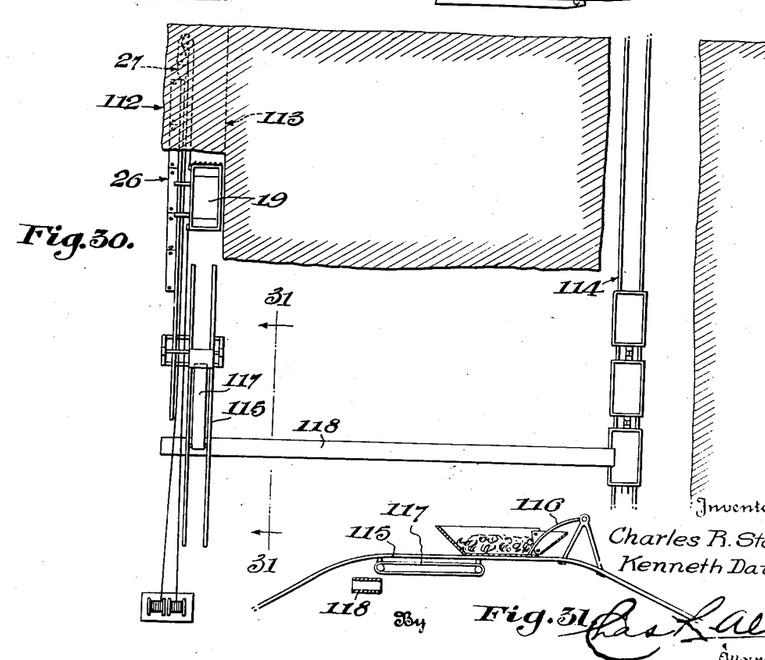
Figure 30 is a diagrammatic plan view illustrating another arrangement for long face mining.
Figure 31 is a detail vertical cross section taken on the line 31—31 on Figure 30.

In Figures 30 and 31, we have shown another form of long face cut in which the long face 112 extends in the same direction with the main body of the trackage composed of the anchor and guide rails 27 and 26. In this illustration, the undercut is illustrated as at 113 and the trackage and car trip, disposed in parallel relation, are indicated at 114. As the slipper 19 is reciprocated back and forth, it may ride up over a bridge ramp 115 and have the loaded coal stripped therefrom by a stripper plate 116 mounted on said ramp. The stripped coal may be deposited upon a short conveyor 117 supported beneath and longitudinally of the ramp 115, and a long transverse conveyor 118 may receive the coal from the delivered end of the conveyor 117 and deposit it, serially, into the trip of cars.

Figure 32:
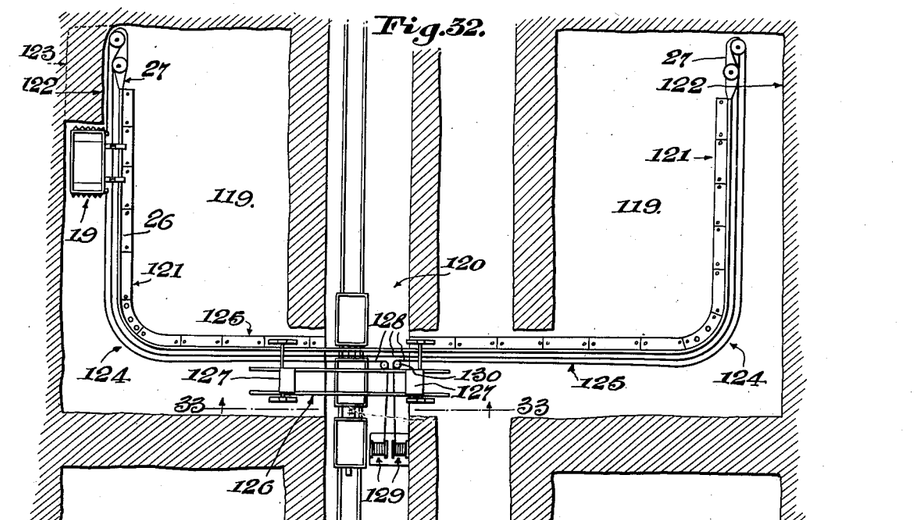
Figure 32 is a diagrammatic plan view illustrating the working of wide rooms at opposite sides of the take-out trackage.
Figures 33, 34, 35:
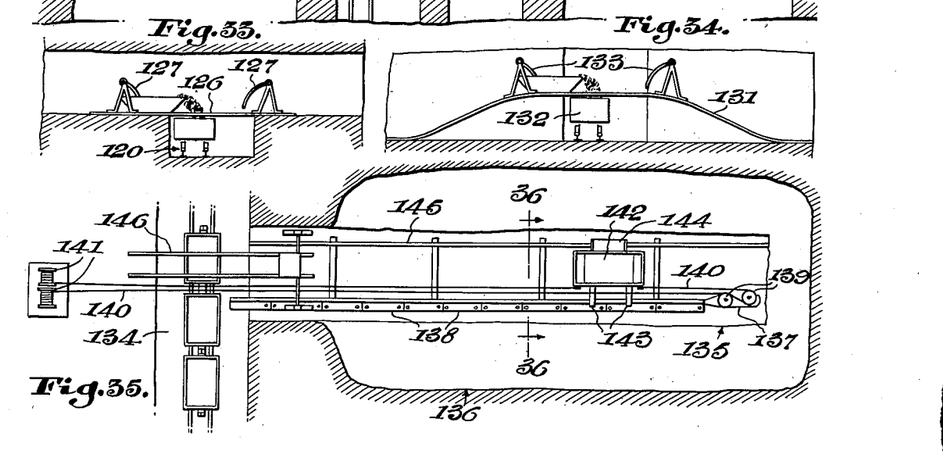
Figure 33 is a detail vertical cross section taken on the line 33—33 on Figure 32.
Figure 34 is a vertical cross section showing a loading ramp positioned over the take-out trackage in thick vein mining presenting high ceilings.
Figure 35 is a diagrammatic plan view illustrating a bench mining arrangement.

In Figures 32 and 33 of the drawings, we have illustrated how the invention can be employed in loading coal broken down from long faces in wide rooms at opposite sides of the main course. In this illustration, the wide rooms are indicated at 119 and the main course, in which the trackage and car trip are located, is indicated at 120. A line 121 of anchor and guide rail sections is disposed in each room, paralleling the long face 122 thereof. It is to be understood that the long faces are undercut as at 123 and broken down for loading purposes as hereinbefore described. The parallel trackage lines 121 connect, by curved portions 124, with transversely positioned trackage lines 125. The slipper guiding and supporting bridge 126 is mounted over the trip of cars in the main course 120 and a pair of reversely positioned stripper plates 127 are pivotally supported on said bridge. In this form of the invention, if desired, a single cable 128 may be used, the free ends thereof being wound reversely upon the drums 129, guided in opposite directions by guide sheaves 130 and looped around the sheaves in the anchor rail sections 27. By manipulation of the drums 129, a slipper 19 may be operated in each or either room 119 in the manner hereinbefore described and one or the other of the stripper plates will serve to strip the loaded coal from the slipper and deposit it into the trip of cars.

In Figure 34 of the drawings, we have illustrated a ramp type of slipper guiding and supporting bridge 131 which may be mounted over a trip of cars in a deep or thick seam, thus rendering unnecessary the taking out of bottom material to provide a trackage and car accommodating course such as is shown in Figure 33. In this figure, a trip of cars bridged by the ramp 131 is indicated at 132 and stripper plates are suitably mounted as illustrated at 133.

Figure 36:
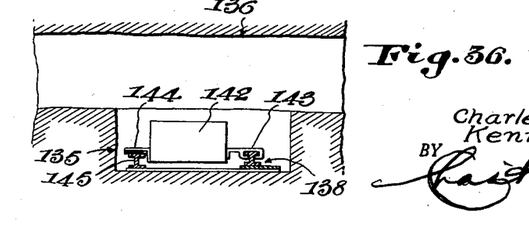
Figure 36 is a vertical cross section taken on the line 36—36 on Figure 35.

In Figure 35 of the drawings, we have illustrated the invention applied to bench mining. In this use of the invention, a driving entry is made in two-strata coal, a high grade seam being disposed at the top and a low grade seam at the bottom. A recessed course or runway 134 disposed transversely of the driving entry accommodates the trackage and trip of cars. The driving entry provides a collecting trough 135 in the lower or low grade strata of coal and then the upper strata of coal is cut out as at 136 so as to fall into and mix with the lower grade of coal in the troughway 135. By now reciprocating the slipper along the trackage in the troughway 135, the high and low grade coal is taken out in substantially mixed form. The trackage is composed of an anchor rail section 137 and a plurality of guide rail sections 138, the anchor rail sheaves 139 serving to loop and guide the cables 140 wound reversely upon the drums 141 and which serves to reciprocate the slipper 142. The slipper 142 is equipped at one side with rail grippers 143 and at its other side with a side plate 144 slidable along the supporting rail portion 145 extended from the guide rail sections previously referred to. A bridge unit 146 is mounted over a trip of cars and carries a stripper blade for stripping loaded coal from the stripper 142 in the manner hereinbefore described.

In Figures 37 to 43 of the drawings, we have illustrated a coal loading slipper which is automatically caused to reciprocate during the coal loading operation. This slipper is generally designated 147 in diagrammatic Figures 37, 42 and 43. The slipper is slidably guided along guide rail sections 148 and travels along a traction chain 149 secured under a mass of shot down coal at its front end as at 150 to the assembled trackage sections and coiled and secured at its rear end as at 151. The slipper guiding trackage formed of sections 148 may include outside or inside curved portions 152 or 153 when a particular installation demands a turn in the trackage. When an inside curve is necessary as shown in Figure 43, a series of jack mounted rollers 154 may be provided for supporting the cross over portion 149.

Figure 38:
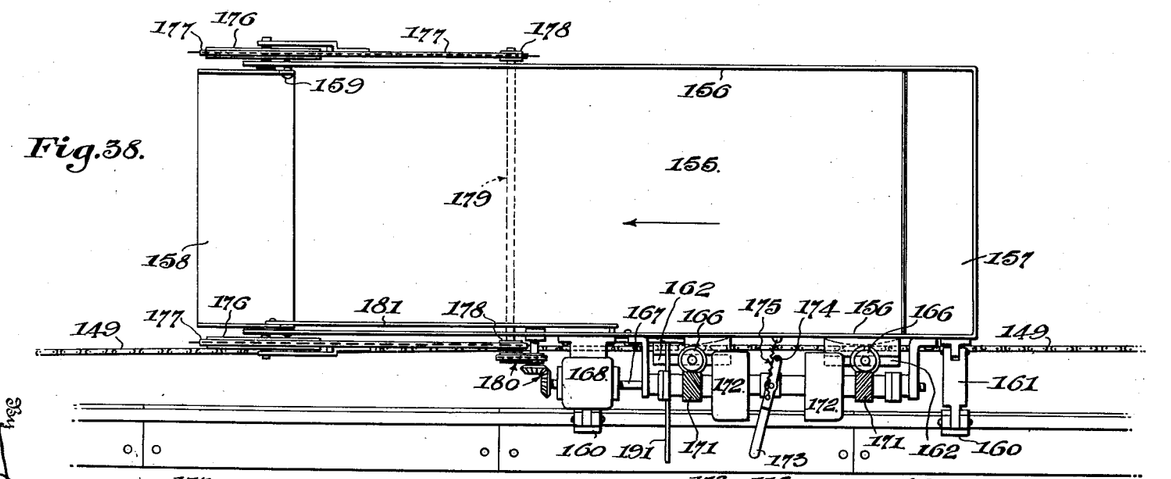
Figure 38 is an enlarged detail plan view of the slipper shown in Figure 37.
Figure 39:
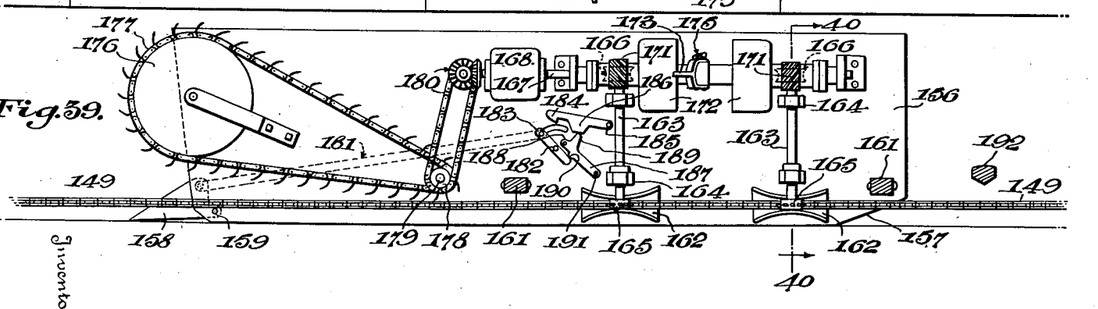
Figure 39 is a detail side elevation of the slipper shown in Figure 38.

This form of slipper includes a bottom 155, sides 156, and an upwardly inclined rear end 157. A shovel gate 158 is hinged as at 159 at the front end of the slipper and rail grippers 160 are mounted at one side of the slipper upon pivot links 161.

The chain 149 passes through two guide members 162 secured to the side wall of the slipper and a vertical shaft 163 rotatable in bearings 164 is associated with each of said guides. A drive sprocket 165 is secured upon the lower end of each shaft 163 within the respective guide 162, said sprockets engaging the chain 149 so that when the shafts 163 are rotated in one direction or another, the slipper will be caused to move in one direction or another along said chain, guided by the trackage section 148.

A worm 166 having its threads pitched at a 45° angle is secured upon the upper end of each shaft 163. The teeth of the worms 166 are reversely directed and adapted to be rotated selectively by a drive shaft 167 to which rotation is imparted by a motor 168 supported on the slipper as shown in Figures 38 and 39. As previously stated the slipper is reciprocated automatically and it will be observed by reference to Figure 37 of the drawings, that the motor is supplied by a feed line 169 wound about a spring drum 170.

Two worms 171 are loosely mounted on the drive shaft 167 and mesh with the worms carried by the respective shafts 163. A clutch 172 is associated with each worm 171 and these clutches are rendered alternately effective for imparting rotation from the shaft 167 to a selective one of the shafts 163 by a lever 173 pivoted as at 174 to the side wall of the slipper and snapped to one or the other of its clutch engaging positions by a spring 175 connected to the lever and to the side wall of the slipper at opposite sides of the pivotal mounting 174.

A large disc or pulley 176 is rotatably mounted at each side of the shovel gate 158, as shown in Figures 38 and 39, and a toothed chain 177 passes around each member 176 and over a drive sprocket 178 on a cross shaft 179 disposed beneath the slipper bottom. The sprockets 178 are driven by power transmission connections 180 from the motor 168.

Figures 40, 41, 42, 45:
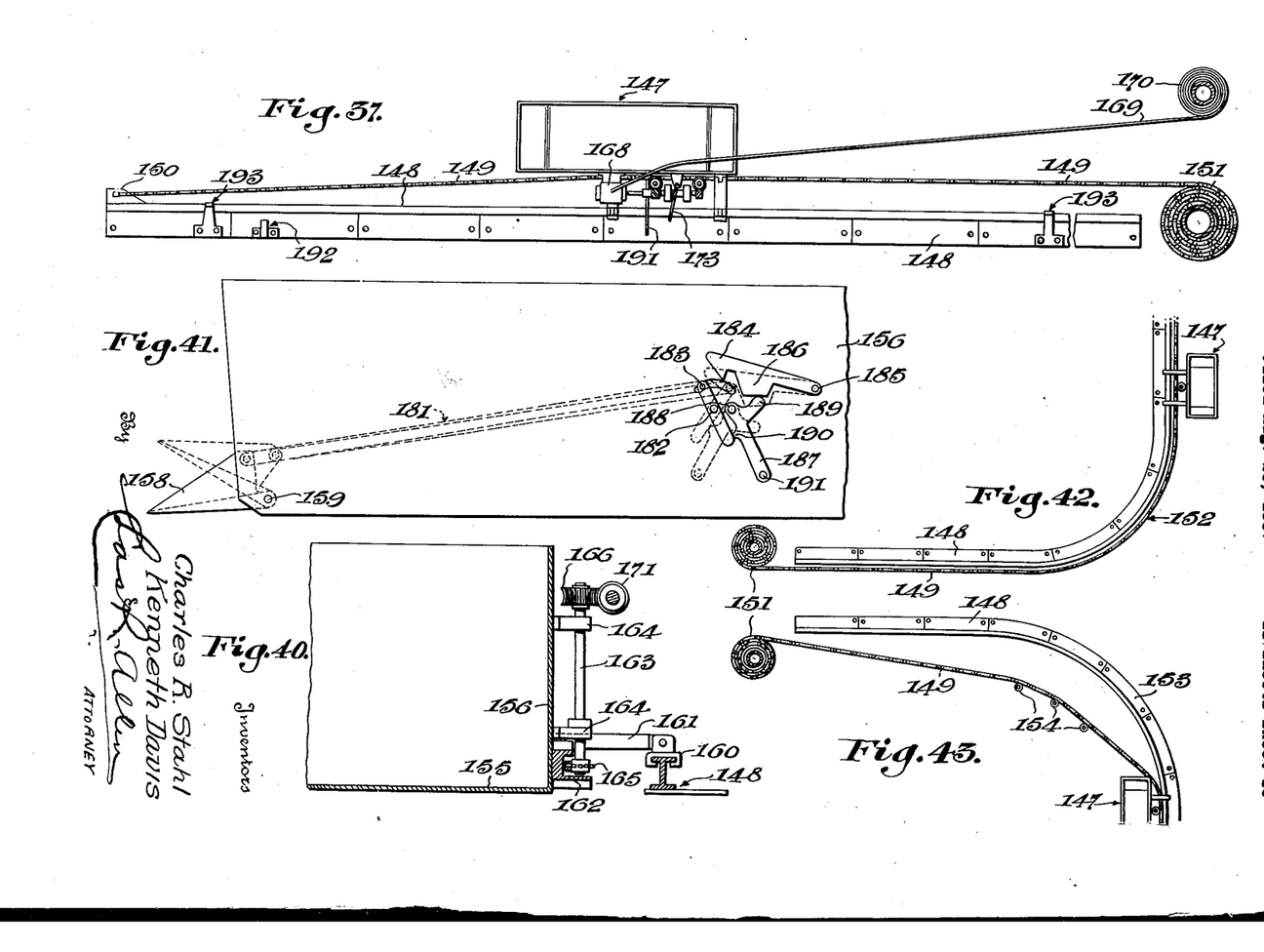

The shovel gate 158 is link-connected as at 181 to a lever pivoted intermediate its ends as at 182 and connected with said link by a latch pin 183 movable in an arcuate slot provided in the side wall of the slipper. A latch member 184 is pivoted as at 185 to the slipper side wall and includes a latch release lug extension 186. A shovel gate releasing and lifting lever 187 is pivoted as at 188 to the slipper side wall and is equipped with a release finger 189 engageable with the release lug 186 and a lift finger 190 engageable with the free end of the lever pivoted at 182. The free end of the lever 187 is equipped with a laterally projected finger 191 engageable with a stationarily positioned track cam 192.

In operation, as the slipper structure shown in Figures 38 and 39 is driven toward the broken coal mass-to-be-loaded by rotation of the properly selected one of the sprockets 166 in engagement with the chain 149, the lever extension 191 will strike the cam and cause the finger 189 to engage and lift the latch member 186, 184 permitting the shovel gate to fall to the position shown in Figure 39 of the drawings. As the slipper moves into the coal mass the chains 177 moving about the discs 176 will dig in and loosen the coal mass to aid in the loading thereof into the slipper. As the retraction or reverse movement of the slipper starts, the lever portion 191 will again engage the track cam 192 and be moved thereby to the position shown at the dotted lines in Figure 41, causing the finger 190 to engage the lever pivoted at 182 and effect a lifting of the shovel gate to the load retaining position shown in dotted lines in Figure 41.

The reverse movement of the slipper will continue until the slipper has moved under the stripper plate associated therewith, and upon again reversing the direction of travel of the slipper the load of coal will be stripped from the stripper and disposed upon a suitable receiving means.

It will be understood that the reversal of the power transmitting connections is effected at each end of the path of reciprocation of the slipper by a suitable stationary cam 193 engaging and shifting the laterally extended end of the clutch lever 173. See Figure 37.

It is of course to be understood that the details of structure and arrangement of parts may be variously changed and modified without departing from the spirit and scope of our invention.

We claim:
1. In apparatus of the character described, a coal gathering slipper, means including power applying devices carried by the slipper and control means engaged by the slipper during reciprocatory movement thereof and automatically effective for reciprocating it into and out of a mass of broken coal, a shovel gate hingedly mounted at the slipper end presented toward the coal mass, and automatically operable means for lowering the gate for edge engagement with the coal mass when entering said mass and for lifting the gate as the slipper is withdrawn from the mass for retaining gathered coal.

2. In apparatus of the character described, a sheave anchored under a broken coal mass, a cable looped about the sheave and extending from the mass, means for protecting the sheave and looped cable portion from the coal mass, a gathering slipper, means including the cable for alternately projecting the slipper into and withdrawing it from said mass, and rigid track means for guiding the reciprocation of said slipper and for supporting said sheave.

3. In apparatus of the character described, a sheave anchored under a broken coal mass, a cable looped about the sheave and extending from the mass, a gathering slipper, means including the cable for alternately projecting the slipper into and withdrawing it from said mass, and means including a guide rail and skid trackage formed in connected sections for guiding and supporting said slipper, one said section forming a support for said sheave.

4. In apparatus of the character described, an anchor rail to be anchored beneath a broken mass of coal comprising a slipper guide rail portion, upper and lower plates, and cable loop guiding sheave equipment mounted between said plates.

5. In apparatus of the character described, an anchor rail to be anchored beneath a broken mass of coal comprising a slipper guide rail portion, upper and lower plates, cable loop guiding sheave equipment mounted between said plates, means for closing the space between the plates adjacent said sheave equipment, and an anchoring plate secured to said rail and having anchor jack receiving seats therein.

6. In apparatus of the character described, a slipper reciprocable into and out of a broken coal mass for loading purposes, rail sections secured in end-to-end relation for guiding said slipper, rail grippers slidably engaging said rails, and supporting links for said grippers hingedly connected to the slipper and to said grippers.

7. In apparatus of the character described, a slipper reciprocable into and out of a broken coal mass for loading purposes, rail sections for guiding said slipper yieldably secured together in end-to-end relation by means including yieldable inserts, and rail grippers slidably engaging said rails and connected to said slipper.

8. In apparatus of the character described, a slipper reciprocable into and out of a broken coal mass for loading purposes, rail sections yieldably secured together in end-to-end relation for guiding said slipper, a pair of rail grippers slidably engaging said rails and connected to said slipper, and an upwardly bowed distance piece joining said grippers.

9. In apparatus of the character described, a slipper reciprocable into and out of a broken coal mass for loading purposes, a guide rail, rail grippers carried by said slipper and slidably guided on said rail, a shovel gate shiftably mounted at the end of the slipper and presented toward the coal mass, means for reciprocating the slipper, and means including a gate latching and releasing devices carried by the slipper and a stationarily supported latching and releasing cam for effecting a shifting of said gate to a coal mass penetrating position when the slipper is moving toward the coal mass and to a coal retaining position when said slipper is moving in the opposite direction.

10. A coal gathering slipper comprising a bottom, side walls, an inclined rear end portion, a shovel gate hingedly connected at its lower edge at the front of the slipper and capable of being lowered and raised to provide a coal penetrating edge when lowered and a coal retaining wall when raised, means for reciprocating the slipper into and out of a mass of broken coal, means carried by said slipper for raising and lowering said gate, and stationarily supported means engageable during reciprocation of said slipper for actuating said raising and lowering means.

11. A coal gathering slipper comprising a bottom, side walls, an inclined rear end portion, a shovel gate hingedly connected at its lower edge at the front of the slipper and capable of being lowered and raised to provide a coal penetrating edge when lowered and a coal retaining wall when raised, a bar secured in spaced relation along one side wall, a slide member slidable along said bar, means connecting the slide member and gate for raising and lowering said gate accordingly as said slide member is moved, and slipper reciprocating cable means attached to the respective ends of said slide member and operable to reciprocate the slipper into and out of a mass of broken coal and for sliding the slide member along said bar a limited distance during each movement of reciprocation of the slipper.

12. A coal gathering slipper comprising a bottom, side walls, an inclined rear end portion, a shovel gate hingedly connected at its lower edge at the front of the slipper and capable of being lowered and raised to provide a coal penetrating edge when lowered and a coal retaining wall when raised, a bar secured in spaced relation along one side wall, a slide member slidable along said bar, means connecting the slide member and gate for raising and lowering said gate accordingly as said slide member is moved, gate latching means carried by the slipper and engageable with the slide member when the gate is in raised position, and slipper reciprocating cable means attached to the respective ends of said slide member and operable to reciprocate the slipper into and out of a mass of broken coal and for sliding the slide member along said bar a limited distance during each movement of reciprocation of the slipper, and means effective upon each movement of the slipper toward the coal mass to release the latching means and permit the slide member to move forwardly and cause a lowering of said gate.

13. In apparatus of the character described, a coal loading slipper, slipper reciprocating means including a cable presenting a pull flight and a return flight, guide eyes projecting laterally from the slipper and slidably embracing said return flight, and means for holding said return flight against free lateral deflections while permitting passage of said eyes.

14. In apparatus of the character described, a coal loading slipper, slipper reciprocating means including a cable presenting a pull flight and a return flight, guide eyes projecting laterally from the slipper and slidably embracing said return flight, and means for holding said return flight against free lateral deflections while permitting passage of said eyes, said last named means comprising a pair of spaced jack members, cable flight retaining plates carried by the jack members and having a longitudinal eye passing opening therebetween, and a swingable plate closing said opening and having cam noses displaceable by passage of said eyes.

15. In apparatus of the character described, a relatively taut slipper guiding cable engageable by guiding means projected from a slipper, and means for holding said cable against free lateral deflections while permitting passage of said eyes, said last named means comprising a pair of spaced jack members, cable retaining plates carried by the jack members and having a longitudinal guiding means passing opening therebetween, and a swingable plate closing said opening and having cam noses displaceable by passage of said guiding means.

16. In apparatus of the character described, a coal loading slipper comprising a bottom, side walls, a shovel gate at each end of the slipper hingedly connected at its lower edge and capable of being lowered and raised to provide a coal penetrating edge when lowered and a coal retaining wall when raised, an operating lever pivoted intermediate its ends on a side wall of the slipper and link connected at its ends with the gates for raising and lowering them, and means for reciprocating the slipper and oscillating said lever.

17. In apparatus of the character described, a coal loading slipper comprising a bottom, side walls, a shovel gate at each end of the slipper hingedly connected at its lower edge and capable of being lowered and raised to provide a coal penetrating edge when lowered and a coal retaining wall when raised, an operating lever pivoted intermediate its ends on a side wall of the slipper and link connected at its ends with the gates for raising and lowering them, means for reciprocating the slipper and oscillating said lever, and a pair of oppositely directed pivoted stripper plates alternately engageable by said slipper for effecting the stripping of loaded coal from one end or the other of said slipper.

18. In apparatus of the character described, guide trackage, a coal loading slipper guided on and movable along said trackage and having provision for picking up, retaining and taking away loads of coal, interengaging traction devices carried respectively on said trackage and slipper, and power means on said slipper for driving said devices and causing said slipper to move along said trackage.

19. In apparatus of the character described, guide trackage, a coal loading slipper guided on and movable along said trackage and having provision for picking up, retaining and taking away loads of coal, interengaging traction devices carried respectively on said trackage and slipper, and means including power means on said slipper for driving said devices and stationary cam means for causing automatic reciprocation of the slipper on said trackage.

20. In apparatus of the character described, guide trackage, a coal loading slipper guided on and movable along said trackage, interengaging traction devices carried respectively on said trackage and slipper, means including power means on said slipper for driving said devices and stationary cam means for causing automatic reciprocation of the slipper on said trackage, a shovel gate carried by said slipper and movable thereon to present a penetrating edge to a broken coal mass or to a coal retaining position, and means automatically operable during reciprocation of the slipper for alternately moving the gate from one to the other of the two stated positions.

21. In apparatus of the character described, guide trackage, a coal slipper reciprocable along said trackage, power means carried by said slipper for imparting movement thereto and including an electric motor, a current supply line connected to said motor, and a spring drum for winding in or paying out said line as the slipper reciprocates.

22. In apparatus of the character described, guide trackage, a coal loading slipper guided on and movable along said trackage, a chain anchored at its ends and lying along said trackage, and power means carried by said slipper and including a driving sprocket in engagement with said chain for causing the slipper to move along said trackage.

23. In apparatus of the character described, guide trackage, a coal loading slipper guided on and movable along said trackage, interengaging traction devices carried respectively on said trackage and slipper, power means on said slipper for driving said devices and causing said slipper to move along said trackage into and out of a broken coal mass, and rotary means driven from said power means and disposed at each side of the coal mass penetrating end of the slipper to dig in and loosen the coal mass.

24. In apparatus of the character described, guide trackage, a coal loading slipper guided on and movable along said trackage, interengaging traction devices carried respectively on said trackage and slipper, means including power means on said slipper for driving said devices and stationary cam means for automatically reciprocating the slipper on said trackage, a shovel gate carried by said slipper and movable thereon to present a penetrating edge to a broken coal mass or to a coal retaining position, means automatically operable during reciprocation of the slipper for alternately moving the gate from one to the other of the two stated positions, a disc at each side of said gate, means for imparting rotation to said discs from said power means, and toothed chains passing over said discs and effective to dig in and loosen the coal mass.

25. In apparatus of the character described, guide trackage, a coal loading slipper guided on said trackage and carrying a motor and having an advance end shaped to penetrate, pick up, retain and take away coal mass portions, interengaging traction devices carried respectively by said trackage and said slipper, and track cam actuated clutch devices carried by said slipper effective to automatically cause reciprocation of the slipper along the trackage.

26. In apparatus of the character described, guide trackage, a coal loading slipper guided on said trackage and carrying a motor, interengaging traction devices carried respectively by said trackage and said slipper, track cam actuated clutch devices carried by said slipper effective to automatically cause reciprocation of the slipper along the trackage, a shovel gate carried by said slipper and movable thereon to present a penetrating edge to a broken coal mass or to a coal retaining position, and means automatically operable during reciprocation of the slipper for alternately moving the gate from one to the other of the two stated positions.

27. In apparatus of the character described; a coal gathering slipper having a bottom, sides and a shovel gate hinged to the bottom at the front edge thereof; means for reciprocating the slipper into and out of a mass of broken coal; and means for lowering the gate to a horizontal digging position just prior to entry into the coal mass; and means for lifting the gate to a coal retaining position as it is withdrawn from the coal mass.

CHARLES R. STAHL.
KENNETH DAVIS.